United States Patent Office 2,908,632
Patented Oct. 13, 1959

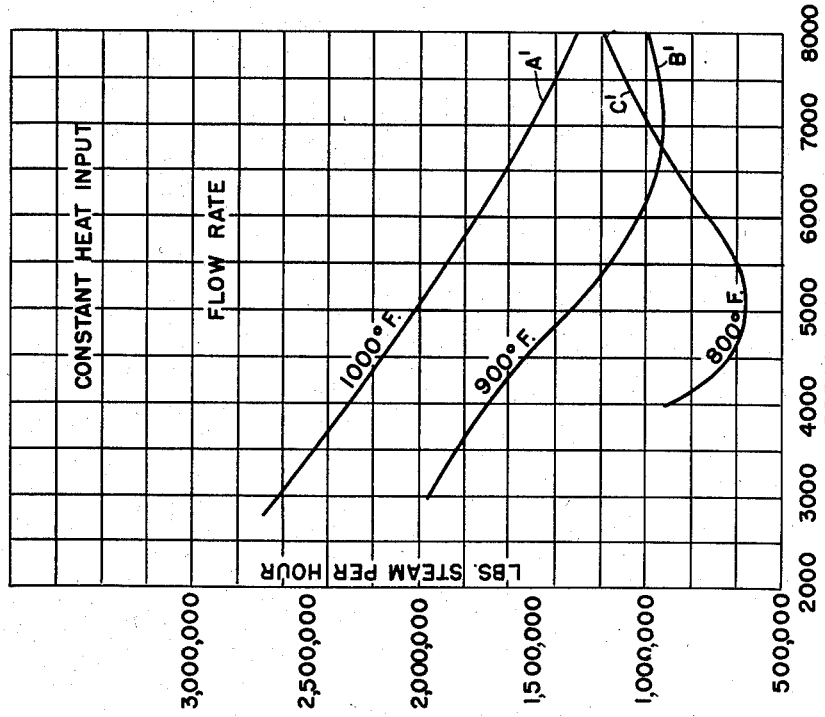
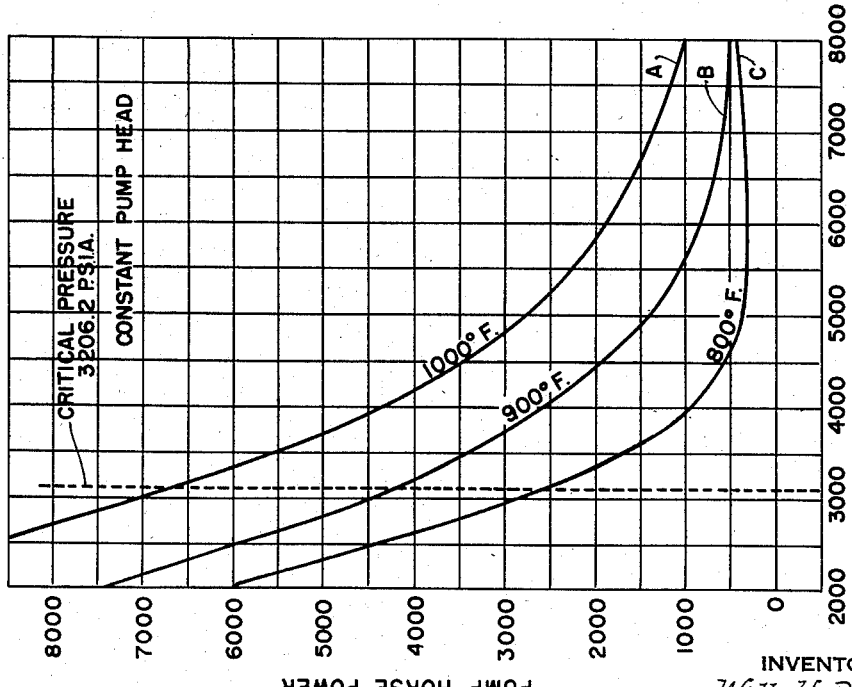

2,908,632
SUPERCRITICAL PRESSURE STEAM HEATING PROCESS

Will H. Rowand, Short Hills, N.J., assignor to The Babcock & Wilcox Company, New York, N.Y., a corporation of New Jersey Application October 7, 1953, Serial No. 384,728

4 Claims. (Cl. 208—106)

The present invention relates in general to the transfer of thermal energy from and to single phase supercritical pressure steam i.e. above 3206.2 p.s.i.a and 705.4° F., which is circulated in a closed flow path.

More specifically the invention relates to improvements in apparatus and processes for fluid heat exchange that requires a substantially constant and high temperature source of thermal energy in a heat transfer, or heat transport system. Such a system may be required in a chemical reaction chamber where it is necessary that the reactants receive thermal energy at substantially constant temperature in an endothermic chemical reaction.

An example of such a system is the catalytic cracking and reforming process for the manufacture of high octane gasoline. The heart of the process is the reaction chamber where naptha is cracked in the presence of hydrogen and a catalyst. The chemical reactions during this operation are predominantly endothermic, thus an essential element is the delivery of thermal energy to the reactants. Usually the cracking takes place where the reactants are at a pressure of 150 to 300 p.s.i. and at a temperature of 950 to 1050° F. The endothermic heat source must, therefore, be at a high temperature. The present invention contemplates supplying the endothermic heat from supercritical pressure steam in non-contact heat exchange.

Heat transfer mediums for effective use in such a process should have at least the following attributes:

(1) A high heat transfer coefficient
(2) Low pumping cost
(3) Be non-destructive, or easily replaced
(4) Safe to handle
(5) Inexpensive Most of the present day heat transfer mediums in use cannot meet the above requirements when at a high temperature such as 1000° F. Some of the mediums are toxic if they escape to the atmosphere and are, therefore, dangerous to operating personnel. Many of the mediums are subject to serious deterioration at high temperature and their use causes high maintenance costs.

The present invention contemplates apparatus for and the use of supercritical pressure and high temperature steam as a heat transfer medium in catalytic reaction processes, and other processes where a high temperature, and constant temperature source of thermal energy is required.

The various features of novelty which characterize my invention are pointed out with particularity in the claims annexed to and forming a part of this specification. However, for a better understanding of this invention, its operative advantages and specific objects obtained by its use, reference should be had to the accompanying drawings and descriptive matter in which is illustrated and described a preferred embodiment of the invention.

In the drawings:

Fig. 2 is a set of curves illustrating the required pump work for the illustrative process using supercritical pressure steam.

Fig. 3 is a set of curves illustrating the variation of steam flow rate required for a fixed heat input.

Figure 1:
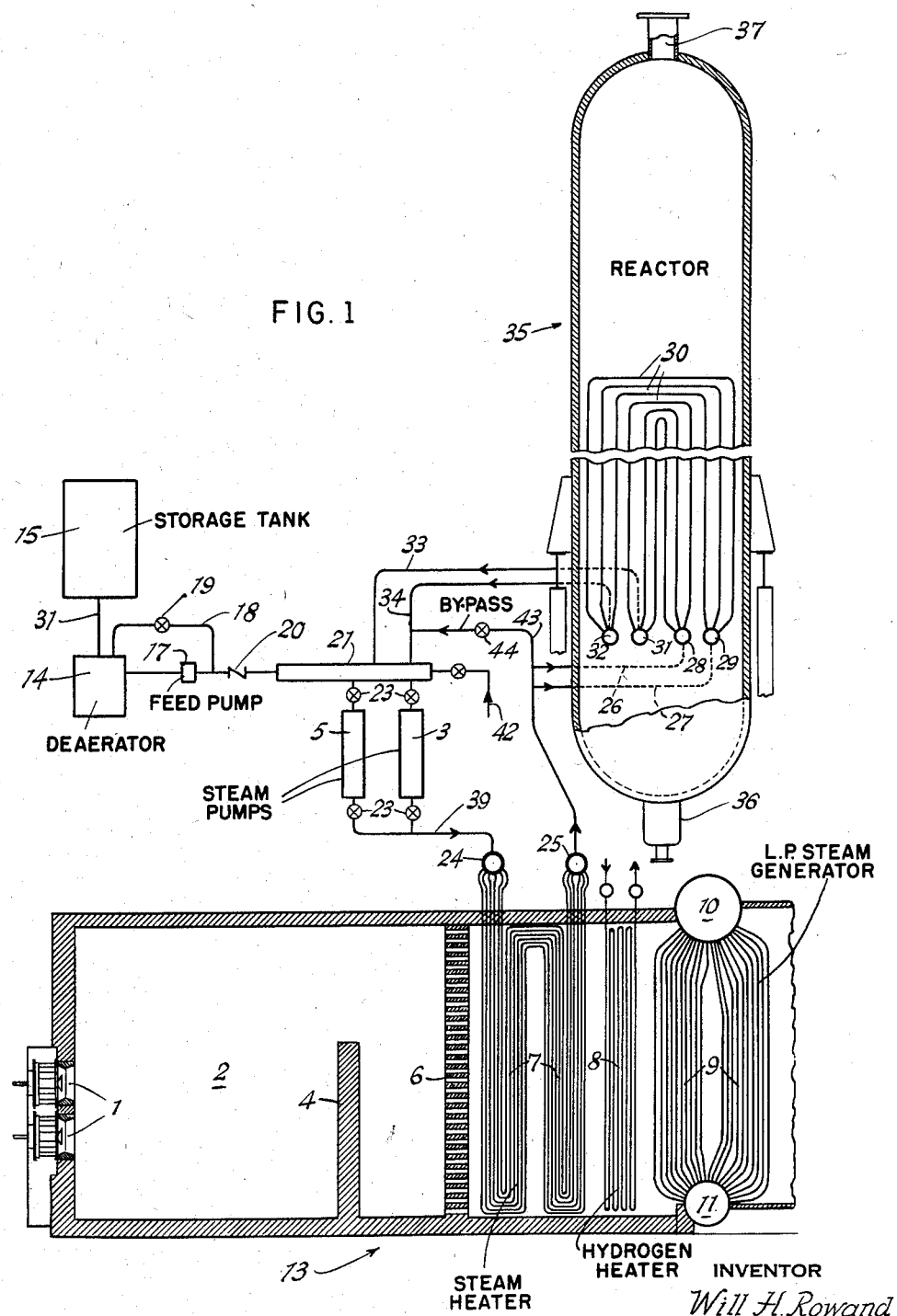
Fig. 1 is a semi-diagrammatic illustration of the process and the apparatus of the preferred embodiment of the invention.

In Fig. 1 there is shown semi-diagrammatically an apparatus which would exemplify the use of the process of using supercritical pressure constant temperature steam as a heat transfer medium in a catalytic reaction chamber. Supercritical pressure steam is heated in a fluid heater apparatus 13 by a heat source such as the products of combustion formed as a result of fuel firing from burners 1. The combustion takes place in a furnace 2 of a fluid heater 13. The heating gases pass over a radiant bridge wall 4 and then through the passages of a refractory gas distributor 6. The gases then pass over a multiplicity of tubular steam heating surface elements 7 during which passage the gas drops in temperature. It then passes over a multiplicity of hydrogen heating surfaces 8 and enters a low pressure steam generating heat transfer surface 9. Upon leaving the steam generator surface the gas is discharged through a stack (not shown). The steam generator 9 within the fluid heater setting is composed of an upper drum 10 and a lower drum 11 connected by suitable downcomers and risers constituting tubular steam generating surface. This unit is used to reduce the combustion products to a safe and economical temperature before they are discharged and to generate low pressure steam for general use. The heater 8 is used for preheating hydrogen for a catalytic reaction process.

Supercritical pressure steam (5000 p.s.i.a. in this example) is heated to 1050° F. in the tubular heat transfer surface 7 of the fluid heater 13 and collected in an outlet header 25. The steam is then conducted by pipes 26 and 27 through the wall 38 of a reactor vessel 35 and into the inlet headers 28 and 29 of the reactor vessel heat exchange surface 30. The steam flow continues through a multiplicity of return bend tubes forming the heat exchange surface 30 while it continuously gives up thermal energy to the chemicals which act as a heat receiver within the reactor vessel 35. The steam at a temperature of 950° F. is collected in the outlet headers 31 and 32 and piped out of the reactor vessel 35 by lines 33 and 34 into a pump suction header 21. There are two regulatable steam pumps 3 and 5, each capable of raising the steam pressure 100 p.s.i. which are connected to the suction header 21 in parallel so that one or both can be used for obtaining the necessary pumping action required by the invention. The steam upon leaving the pumps 3 and/or 5 flows through line 39 into the inlet header 24 of the steam heating surface 7 of the fluid heater 13. The parallel arrangement of the steam pumps 3 and 5 also provides for the availability of one pump for maintenance and repair without shutting down the catalytic process. Either pump can be cut out of the flow system by the selective operation of the isolating valves 23.

In the catalytic reaction process described, the reactants, naptha and hydrogen, accompanied by a suitable catalyst such as molybdenum oxide are fed to the vessel 35 through an inlet opening 36 and the reaction products discharged through the outlets 37 where they would pass through a fractionation tower or other suitable receivers. The catalyst may be in a dust form and, subject to separation from the reaction products. The catalyst then passes to a regenerator (not shown) where it is purified before being returned to the reactor.

For more details of various catalytic petroleum processes which can be benefitted by the use of the above described invention, reference may be had to "Petroleum Refiner," September 1952, Gulf Publishing Company, Houston, Texas, pp. 14–29.

In starting the illustrative supercritical steam system, it is initially filled with low pressure steam from any suitable source through the fill line 42 leading into the pump suction header 21. The steam pump or pumps 3 and 5 may then be started and the steam circulated through the heater 7 and bypassed around the reactor by the bypass line 43 which includes valve 44. The fluid heater 13, after the low pressure steam generator and the hydrogen heater are put in operative condition, is then fired and the steam heating surface 7 transfers heat to the circulating steam. As the steam temperature increases, the system becomes pressurized due to the increased specific volume. However, there are not enough steam molecules in the system to cause the steam pressure to rise above the critical pressure when the steam has reached its operating temperature, therefore, more molecules must be added. The additional steam is obtained by pumping in small amounts of water which are flashed into steam. This occurs because there is sufficient superheat in the steam to vaporize the water without steam condensation. The water is added until the pressure reaches supercritical (5000 p.s.i. in this example). The additional water is obtained from a storage tank 15 and is conducted through line 31 to a small deaerator 14 where any dissolved oxygen is removed. From the deaerator it passes to a feed pump 17 which effects a pressure greater than that existing in the steam system. The water then passes through a stop-check valve 20 into the steam pump suction header 21 where it is vaporized. The water, before it is added into the system, is given exhaustive deaeration treatment by the bypass of a large percentage of the feed pump output through line 18 and valve 19 back to the deaerator. This assures a low oxygen content feed water for the system. The system feed water is preferably of high chemical purity such as distilled and demineralized water.

The system exemplified above transports, absorbs and emits thermal energy while the working fluid, supercritical pressure steam, is maintained in a single gaseous phase. This allows unrestrictive placement of heating and cooling surface as contrasted with condensing systems. Further, the forced flow obtained by the pump allows the thermal transport rate to be regulated by the control of steam flow when process operation demands. It is also noteworthy that the heat transfer is substantially uniform throughout the heating surface, thus the designer of systems or processes operated in conjunction with the invention may at all times obtain the maximum utilization of thermal energy.

The illustrative steam system, because it includes a closed flow circuit and a pump, can be operated at any flow rate desired by the operator. The fluid heater 13 may also be any size desired. Therefore, the combination of a recirculated steam circuit and the fluid heater may be proportioned so as to give any desired steam inlet and outlet temperature conditions for the reactor 35. Any desirable pressure may also be obtained by the apportionment of the additional water from the pump 17. The operative flexibility which is inherent in the system renders it effective over a wide range of steam temperatures and pressures.

Fig. 2 is a set of curves which illustrate the economical pumping of supercritical steam. The curves show the pumping horse power required for various temperatures and pressures. Curve A, represents horse power-pressure function of steam at 1000° F. The same relationship is shown in curves B and C which are for constant temperatures of 900° F. and 800° F. respectively. These curves indicate that the pumping horse power is inversely proportional to the pressure of the steam for a constant temperature. Fig. 3 presents a companion set of curves A', B', C' to show a comparison relationship of the required flow rate-pressure function for the same temperatures when there is a fixed heat transfer rate and constant pumping head requirement. These curves show rather clearly that the required pumping horse power of supercritical pressure steam is considerably lower than that of steam below the critical pressure. This low pumping power attribute results from the fact that, at pressures above the critical, the steam is very highly compressed and has a density near that of water. This density gives rise to very high specific heats which are above that of water. It is, therefore, the combination of high density and high specific heat which allows a low rate of flow and a minimum temperature drop of the fluid in the heat exchanger, while expending a minimum of mechanical energy in pumping action. The low operating cost due to the low pumping energy requirement makes the system economically advantageous.

Another feature of supercritical pressure steam is that it has a unique combination of high specific heat, thermal conductivity, and density, combining to give unusually high heat transfer coefficients which are equal to that of boiling water. This makes it possible for the steam to be used in heat exchangers at a minimum temperature to effect a given heat transfer rate. Consequently the heating surfaces 7 may be operated at metal temperatures low enough to eliminate the expense of high alloy tubes even when conducting steam at a temperature of 1050° F.

Steam, because of its very tight molecular bonds, is extremely stable and will not deteriorate with use. Even if there is loss of steam from the system, it is easily replaced by inexpensive water.

Steam has a further advantage that, if it does escape to the atmosphere, it is not toxic nor particularly destructive to equipment.

It should be understood that the use of supercritical pressure steam as a source of thermal energy is not restricted to catalytic reactors in the petroleum industry, but may be used in various chemical industries where a controlled heat source is required. Further it is contemplated that such a fluid could be used in heat exchange systems where a single phase, high specific heat, high heat transfer coefficient, and high density fluid is required as a heat transfer or transport medium.

While in accordance with the provisions of the statutes, there has been illustrated and described herein a preferred embodiment of the invention, those skilled in the art will understand that changes may be made in the form of the apparatus disclosed, without departing from the spirit of the invention covered by my claims, and certain features of the invention may sometimes be used to advantage without a corresponding use of other features.

What is claimed is:

1. A method of transporting thermal energy from a heat source to a heat receiver which comprises absorbing thermal energy from the heat source by supercritical pressure steam, pumping the steam in a confined stream to the heat receiver, transferring thermal energy from the steam to the heat receiver, returning said steam stream to the heat source for further heating, and maintaining said steam above its critical values of pressure and temperature throughout the cycle, whereby there is a continuous transport of thermal energy by a fluid always in a single phase.

2. In catalytic cracking and reforming processes a method of heating the chemical reactants in a reaction chamber, which comprises the transfer of thermal energy to the reactants in indirect heat exchange by supercritical pressure steam, reheating said supercritical pressure steam by the heat of combustion an amount equal to that given up to the reactants, and the recirculation of the steam at high rates of flow to maintain the steam within a predetermined limited range of temperature and pressure above its critical values to provide a single phase fluid during the entire process.

3. A method of transporting thermal energy from a heat source to a heat receiver which comprises absorbing thermal energy from the heat source by supercritical pressure steam, pumping the steam in a confined stream to the heat receiver, transferring thermal energy from the steam to the heat receiver, recycling said steam at high rates of flow to maintain the steam during the entire process within a predetermined limited range of pressures and temperatures above its critical values of pressure and temperature.

4. A method of transporting thermal energy from a heat source to a heat receiver which comprises recycling steam below its critical pressure in a constant volume closed flow path between said heat source and heat receiver, heating the circulating below critical pressure steam by thermal energy released from the heat source until a predetermined superheated temperature is reached, injecting water into said below critical pressure steam and simultaneously vaporizing the injected water by the heat of the steam until the increased quantity of vapor in the constant volume of the flow path causes the steam pressure to reach supercritical pressure, transferring thermal energy from the recycled steam to the heat receiver, and thereafter continuously recycling said steam at high rates of flow to maintain the steam during such recycling within a predetermined limited range of pressures and temperatures above its critical values of pressure and temperature.

References Cited in the file of this patent

UNITED STATES PATENTS

| | | |
|---|---|---|
| 1,632,575 | Abendroth | June 14, 1927 |
| 1,751,533 | Taylor | Mar. 25, 1930 |
| 1,816,793 | Petersen | July 28, 1931 |
| 2,121,027 | Forward | June 21, 1938 |
| 2,185,929 | Simpson | Jan. 2, 1940 |
| 2,232,909 | Gohr | Feb. 21, 1941 |
| 2,237,054 | Jensen | Apr. 1, 1941 |
| 2,273,865 | Houdry | Feb. 24, 1942 |
| 2,679,831 | Henkel | June 1, 1954 |